June 11, 1963 — R. BECKADOLPH — 3,093,181
PNEUMATIC TIRE

Filed May 2, 1961 — 2 Sheets-Sheet 1

INVENTOR
Richard Beckadolph
BY

June 11, 1963   R. BECKADOLPH   3,093,181
PNEUMATIC TIRE

Filed May 2, 1961   2 Sheets-Sheet 2

INVENTOR
Richard Beckadolph
BY

United States Patent Office 3,093,181
Patented June 11, 1963

3,093,181
PNEUMATIC TIRE
Richard Beckadolph, Hannover, Germany, assignor to Continental Gummi-Werke Aktiengesellschaft, Hannover, Germany
Filed May 2, 1961, Ser. No. 107,095
Claims priority, application Germany May 17, 1960
5 Claims. (Cl. 152—361)

The present invention relates to a pneumatic tire which may have a radial carcass, i.e. radially extending threads, cables, bands or the like in the tire side walls or may have also unarmed side walls. The invention furthermore concerns a pneumatic tire having an insert of parallel threads, cables, bands or the like arranged in different layers.

It is known to arrange the threads or the like of an insert in such a way that they extend in the circumferential direction of the tire. It is furthermore known in an insert to employ threads or the like extending transverse to the circumferential direction of the tire.

It has also been suggested to surround cord layers of the insert by further layers.

It is an object of the present invention to provide a pneumatic vehicle tire which, while being able softly to yield under pressure or load, will have such lateral stabilization and cross sectional shape that for all practical purposes relative movements between tread surface and road surface will be eliminated.

It is another object of this invention to provide a tire of the type set forth in the preceding paragraph, which will be relatively simple in construction.

These and other objects and advantages of the invention will appear more clearly from the following specification in connection with the accompanying drawing, in which:

FIGS. 1, 2 and 4 respectively illustrate a partial transverse section through three different embodiments of a tire according to the present invention.

General Arrangement

Figure 1:
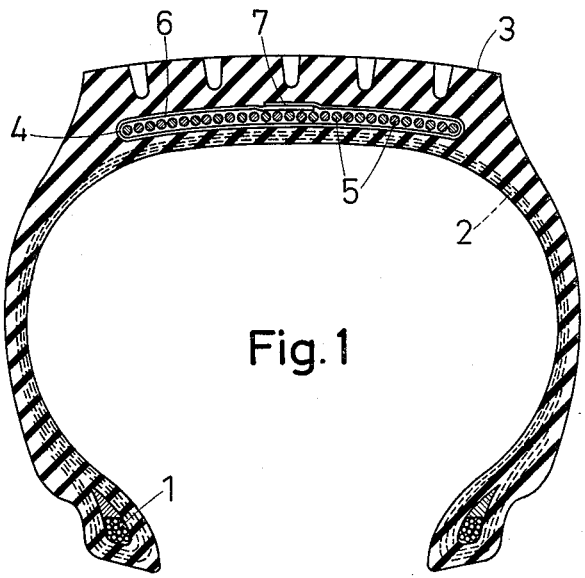

The present invention is based on the finding that the wear at the road contact surface and that the premature wear of the reinforcing layers of the insert can be eliminated or considerably reduced if, during the shaping operation of the tire, an upsetting of the tread surface on the road contacting point will be obviated as far as possible. This effect, however, can be obtained only when the reinforcing layers of the insert will obviate such upsetting deformations, i.e. in spite of the yielding or cushioning at the bottom contacting point, a circumferential contraction of the tread surface must be prevented.

According to the present invention, the insert of a tire with a radial carcass or with unarmed side walls consists of threads, cables, cords or the like which extend transverse to the circumferential direction of the tire. Furthermore, the layers containing the threads or the like extending transverse to the circumferential direction of the tire are so designed that they surround the threads or the like extending in circumferential direction of the tire or surround the layers formed by said threads or the like. The thus surrounded threads or the like of the insert which extend in the circumferential direction of the tire will by the transverse threads surrounding the same be prevented from evading in upward or downward direction or to the sides so that a circumferential contraction at the ground contacting portion and thereby relative movements between tread surface and road surface will for all practical purposes be eliminated. Moreover, the transverse threads practically offer no resistance during the yielding of the tire under load so that also a softly yielding pneumatic tire will be obtained the lateral stabilization and cross sectional shape of which will be assured by threads, cables or the like extending in circumferential direction of the tire.

Structural Arrangement

With specific reference to the drawing, the tires shown therein comprise a radial carcass 2 anchored on the bead cores 1. The insert 4 mounted between the tread surface 3 and the radial carcass 2 in the zenith portion of the tire extends substantially over the width of the tread surface 3. The said insert 4 thus forms a substantially hollow cylindrical belt surrounding carcass 2. This belt is subjected to pressure by the tire inner pressure and assures the cross sectional shape of the tire as shown in the drawing.

The insert or intermediate structure 4 comprises pull-resistant threads 5, cables or the like preferably steel cables which are arranged parallel to each other and extend in circumferential direction of the tire. Threads 5 may be arranged in one layer or in two or more superimposed layers. Threads 5 or the layers formed thereby are surrounded by further threads or the like 6 arranged in cord layer form. The said threads or the like 6 are arranged at a right angle with regard to threads 5 so as to be transverse to the circumferential direction of the tire. The threads 6 thus form a layer which is so folded as to surround the threads 5. In order to obtain a firm connection or coherence, the threads 6 between the tread surface 3 and threads 5 may be arranged so as to overlap in the center of the insert 4 as has been clearly shown in FIG. 1 at 7. The transverse threads 6 prevent undesired upsetting deformations of threads 5 and surround the threads 5 in a bandage-like manner in such a way that at the bottom contacting portion or at the depression here occurring of the tire body, an upsetting deformation of the threads 5 or the like cannot occur. In other words, although one portion of the tire is depressed, a reduction in the circumference of the intermediate structure 4 or tread surface 3 will, with regard to a non-locally depressed tire body, not occur.

Figure 2:
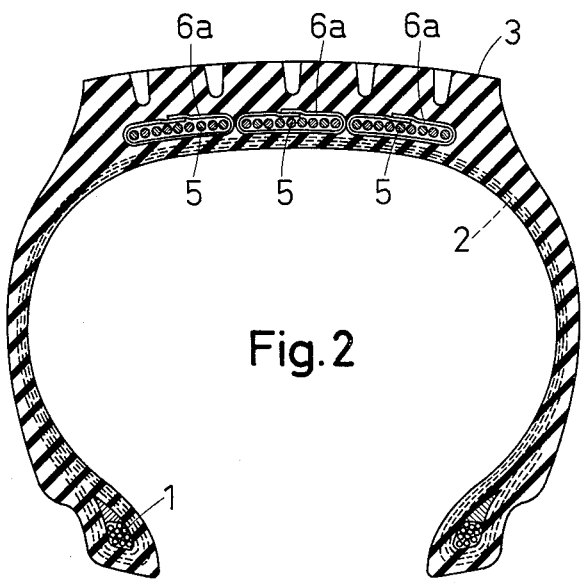

The arrangement of FIG. 2 differs from that of FIG. 1 in that the circumferential threads 5 or the like are combined to groups, and each group of the threads or the like 5 is surrounded by transverse threads 6a.

Figure 3:
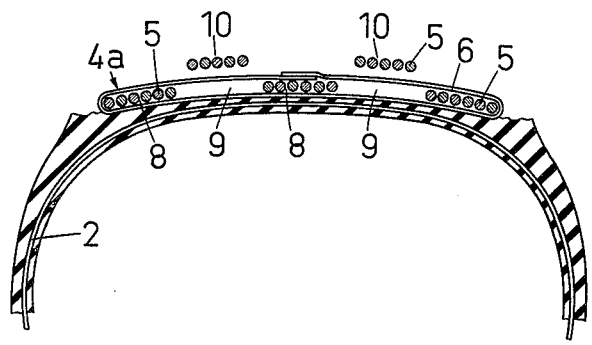
FIG. 3 illustrates an intermediate step in the manufacture of a tire according to FIG. 4.
Figure 4:
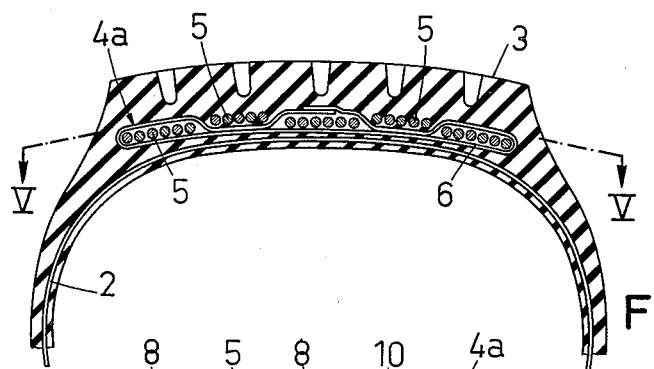
Figure 5:
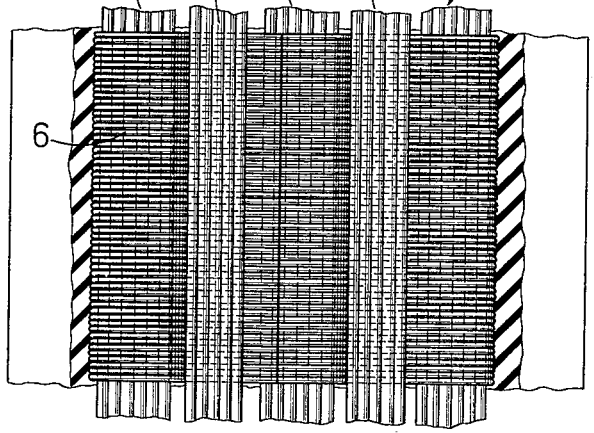
FIG. 5 is a section taken along the line V—V of FIG. 4 showing the circumferential and transverse arrangement of the thread groups forming the insert.

A particularly favorable design of the intermediate structure or insert 4a is illustrated in FIGS. 3 and 4. According to this construction, the intermediate structure 4a is formed of thread groups 8 with threads 5 extending in the circumferential direction of the tire, in such a way that between the individual thread groups 8, there will remain interstices or intermediate spaces 9. The thread groups 8 will in their turn in conformity with the design of the insert 4 of FIG. 1 be surrounded by threads 6. Moreover, above the said free spaces 9, additional thread groups 10 with threads 5 extending in circumferential direction are provided. The thus designed composition of the reinforcing inserts of the pneumatic tire is followed by a pressure treatment. More specifically, a pressure higher than atmospheric pressure is introduced into the hollow chamber of the tire, as a result of which the intermediate structure or insert 4a will be deformed in the sense of an increase in diameter. However, it is also possible to carry out a certain diameter enlargement of the intermediate body 4a prior to depositing the intermediate structure 4a onto the radial carcass 2.

With this deformation of the intermediate structure 4a the chambers 9 while the threads 6 are being deformed, receive the thread groups 10 so that with the completed intermediate structure or the completed tire, the intermediate structure will obtain the cross sectional shape according to FIG. 4 in which the threads 6 alternately surround the groups 8 and 10.

In this connection, it may also be pointed out that the intermediate structure 4a shown in FIG. 4 may again be surrounded by a layer with transversely extending threads 6 in conformity with the laying of the threads 6 according to FIG. 1. The design of the intermediate structure 4a according to FIG. 4 may also be obtained by building the intermediate structure up, if desired together with the carcass 2, on a drum. The thread groups 10 or threads 5 will in this instance be placed in the spaces 9 not by increasing the diameter of the intermediate structure or its portions at the inner circumference but by depositing threads 5 of groups 10 on the threads 6 under considerable tension.

The manufacture of the intermediate structure 4a according to FIGS. 3 and 4 results in a considerable strengthening of the intermediate structure without causing any harmful effects.

It is, of course, to be understood that the present invention is, by no means, limited to the construction shown in the drawing but also comprises any modifications within the scope of the appended claims.

It is also to be understood that the terms "thread" and "thread means" in the description and claims also include wires, cables, bands and chords.

What I claim is:

1. In combination in a pneumatic vehicle tire having a tread portion and a carcass: insert means arranged between said carcass and said tread portion and comprising substantially parallel first thread means extending in circumferential direction of said tire, said insert means also comprising second thread means extending transverse to and being looped around at least some of said first thread means in a direction transverse to said first thread means while also extending below and above at least some of said first thread means in a direction transverse to said tire.

2. In combination in a pneumatic vehicle tire having a tread portion and a carcass: insert means arranged between said carcass and said tread portion and comprising at least one layer of substantially parallel first thread means extending in circumferential direction of said tire and being subdivided into groups arranged in transverse direction of said tire, said insert means also comprising at least one layer of second thread means extending transverse to said first thread means and alternately around and below adjacent groups of first thread means.

3. A tire structure according to claim 2, in which said groups of first thread means are located in nearly the same transverse plane.

4. A tire structure according to claim 2, in which said second thread means are constricted below every other group of first thread means.

5. In combination in a pneumatic vehicle tire having a tread portion and a carcass: insert means arranged between said carcass and said tread portion and comprising substantially parallel first thread means extending in circumferential direction of said tire and being sub-divided into groups arranged in transverse direction of said tire, said insert means also including a plurality of groups of second thread means respectively looped around said groups of said first thread means in a direction transverse to said first thread means while simultaneously extending above and below said groups of first thread means in a direction transverse to said tire.

References Cited in the file of this patent

UNITED STATES PATENTS

| 2,895,525 | Lugli | July 21, 1959 |
| 2,985,214 | Lugli | May 23, 1961 |

FOREIGN PATENTS

| 1,178,636 | France | Dec. 15, 1958 |